(12) United States Patent
Burch et al.

(10) Patent No.: US 11,964,378 B2
(45) Date of Patent: *Apr. 23, 2024

(54) JOB BOX

(71) Applicant: MILWAUKEE ELECTRIC TOOL CORPORATION, Brookfield, WI (US)

(72) Inventors: Sara Burch, Milwaukee, WI (US); David Proeber, Milwaukee, WI (US); Benjamin D. Gall, Wauwatosa, WI (US); David A. Selby, Oconomowoc, WI (US); Jeremy R. Ebner, Milwaukee, WI (US); Ryan B. Jipp, Brookfield, WI (US); Mark W. Cors, St. Francis, WI (US); Samuel Sheeks, Germantown, WI (US); Jonathan Lowry, Milwaukee, WI (US); Scott T. Moeller, Richfield, WI (US); Whitney Montondo, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,606

(22) Filed: Jan. 3, 2022

(65) Prior Publication Data

US 2022/0120433 A1 Apr. 21, 2022

Related U.S. Application Data

(63) Continuation of application No. 15/895,436, filed on Feb. 13, 2018, now Pat. No. 11,215,353.
(Continued)

(51) Int. Cl.
*B25H 3/02* (2006.01)
*F21V 33/00* (2006.01)
*H01M 10/615* (2014.01)
*H01M 10/6235* (2014.01)
*H02J 7/00* (2006.01)
(Continued)

(52) U.S. Cl.
CPC ........... *B25H 3/02* (2013.01); *F21V 33/0084* (2013.01); *H01M 10/615* (2015.04); *H01M 10/6235* (2015.04); *H02J 7/0013* (2013.01); *H02J 7/0042* (2013.01); *B25H 3/04* (2013.01); *H01M 2220/30* (2013.01); *H01R 33/90* (2013.01);
(Continued)

(58) Field of Classification Search
CPC ...................................... H02J 7/0042
USPC .......................................... 320/113
See application file for complete search history.

(56) References Cited

U.S. PATENT DOCUMENTS 1,652,984 A 12/1927 Hixson
5,143,440 A 9/1992 Trampota
(Continued)

*Primary Examiner* — Edward Tso
*Assistant Examiner* — Ahmed H Omar
(74) *Attorney, Agent, or Firm* — Michael Best & Friedrich LLP

(57) ABSTRACT

A job box includes a base defining a storage area, a lid coupled to the base and moveable between an open position, in which the storage area is accessible, and a closed position, in which the storage area in not accessible, and a charging station supported by the base. The station includes a first charging port configured to charge a battery pack of a first type, a second charging port configured to charge a battery pack of a second type, a light, and a first power outlet. The charging station is moveable relative to the job box to a plurality of different positions.

19 Claims, 16 Drawing Sheets

Related U.S. Application Data

(60) Provisional application No. 62/458,914, filed on Feb. 14, 2017.

(51) Int. Cl.
*B25H 3/04* (2006.01)
*H01R 33/90* (2006.01)

(52) U.S. Cl.
CPC ............ *H02J 7/00* (2013.01); *H02J 7/00032* (2020.01); *H02J 7/00047* (2020.01); *H02J 7/0044* (2013.01)

(56) References Cited

U.S. PATENT DOCUMENTS

| | | | |
|---|---|---|---|
| 5,459,648 A * | 10/1995 | Courtney | ............ F21V 33/0084 362/427 |
| 5,685,421 A | 11/1997 | Gilmore | |
| 5,803,586 A | 9/1998 | Velez et al. | |
| 6,474,521 B1 | 11/2002 | Young | |
| 6,981,780 B2 | 1/2006 | Einav | |
| 7,055,983 B1 | 6/2006 | Baker et al. | |
| 7,484,858 B2 | 2/2009 | Deighton et al. | |
| 9,566,704 B1 | 2/2017 | Stoikos et al. | |
| 9,656,029 B2 | 5/2017 | Tsang et al. | |
| 11,215,353 B2 | 1/2022 | Burch et al. | |
| 2004/0122597 A1 | 6/2004 | van de Ligt | |
| 2005/0103783 A1* | 5/2005 | Bergum | .................... B25H 3/02 220/23.86 |
| 2006/0214642 A1 | 9/2006 | Miyazaki et al. | |
| 2007/0193999 A1 | 8/2007 | Peterson et al. | |
| 2010/0085745 A1 | 4/2010 | Kristiansen et al. | |
| 2014/0327396 A1 | 11/2014 | Rejman | |
| 2016/0075265 A1 | 3/2016 | Claire et al. | |
| 2017/0063114 A1* | 3/2017 | Briere | ...................... B25H 3/02 |

\* cited by examiner

JOB BOX

CROSS-REFERENCE TO RELATED APPLICATIONS

This application is a continuation of U.S. Non-Provisional Utility patent application Ser. No. 15/895,436, filed Feb. 13, 2018, now U.S. Pat. No. 11,215,353, which claims priority to U.S. Provisional Patent Application No. 62/458,914, filed Feb. 14, 2017, the entire content of each is incorporated by reference herein.

FIELD OF THE INVENTION

The present invention relates to storage containers and, more particularly, to job boxes with lights and/or heating elements.

BACKGROUND OF THE INVENTION

Job boxes are used at job sites. Job boxes are used to carry tools and batteries for tools.

SUMMARY OF THE INVENTION

In one embodiment, the invention provides a job box includes a base defining a storage area, a lid coupled to the base and moveable between an open position, in which the storage area is accessible, and a closed position, in which the storage area in not accessible, and a light supported by the base or the lid and configured to illuminate the storage area.

In another embodiment, the invention provides a job box including a base defining a storage area, a lid coupled to the base and moveable between an open position, in which the storage area is accessible, and a closed position, in which the storage area in not accessible, and a heating element positioned within the base and configured to warm a battery pack.

In yet another embodiment, the invention provides a job box including a base defining a storage area, a lid coupled to the base and moveable between an open position, in which the storage area is accessible, and a closed position, in which the storage area in not accessible, a light supported by the base or the lid and configured to illuminate the storage area, and a heating element positioned within the base and configured to warm a battery pack.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
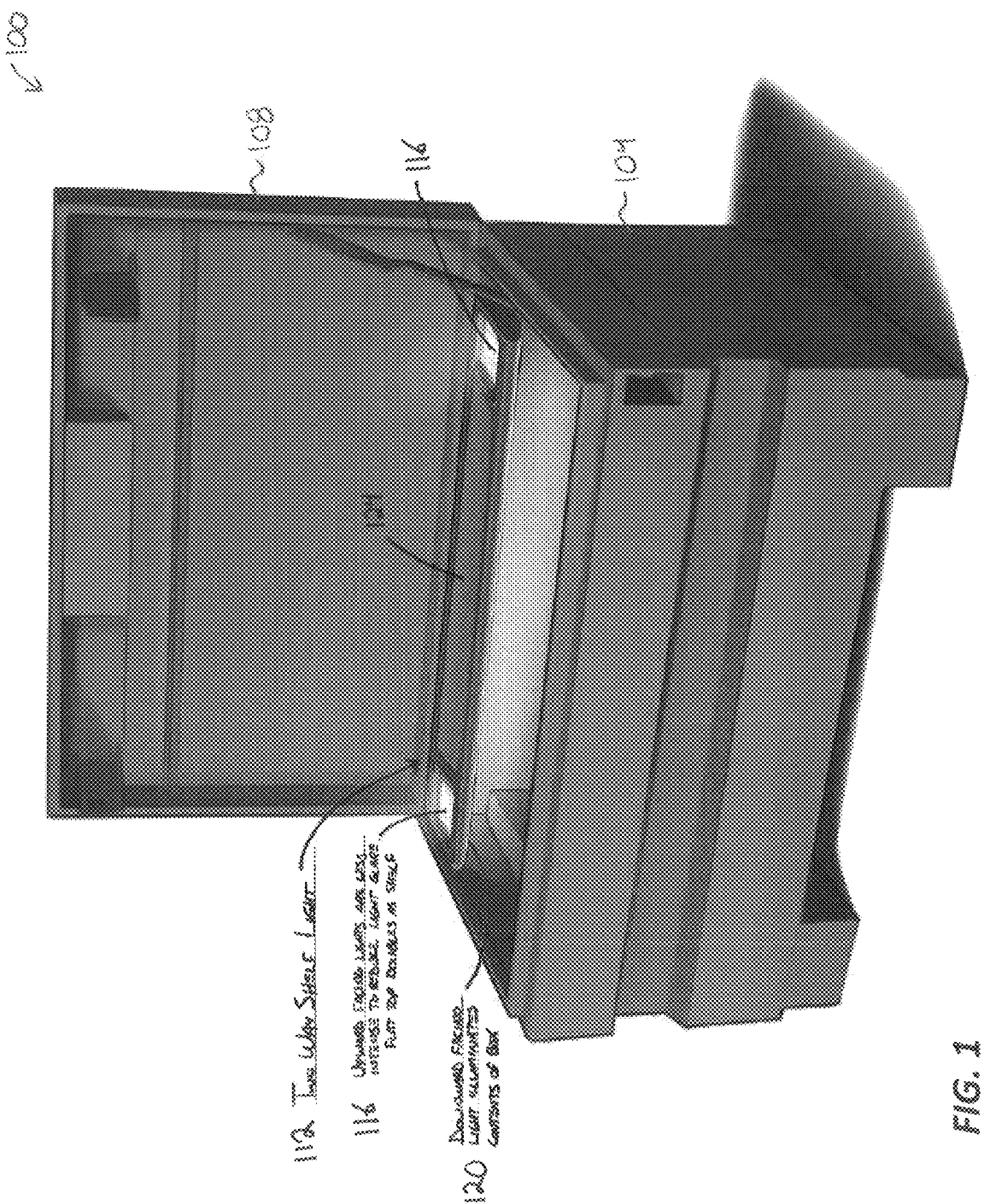
FIG. 1 is a perspective view of a job box including a two-way shelf light.

FIG. 1 illustrates a job box 100 including a base 104 and a lid 108. The base 104 defines a storage area for receiving and storing items, such as tools and accessories at a jobsite. The lid 108 is pivotally coupled to the base 104 for movement between an open position and a closed position. In the illustrated embodiment, the job box 100 also includes a two-way shelf light 112 coupled to the base 104 adjacent an upper edge of the base 104. The shelf light 112 includes upward facing lights 116 that shine toward the lid 108, and lower facing lights 120 that shine into the base 104. The lights 112, 116 may include, for example, light emitting diodes (LEDs) powered by a DC power source (e.g., a power tool battery pack) or an AC power source (e.g., a wall outlet or generator). In some embodiments, the upward facing lights 116 may be less intense than the lower facing lights 120 to reduce light glare. The shelf light 112 also includes a shelf area 124 between the upward facing lights 116. The shelf 112 extends between the upward facing lights 116 and may be used to place smaller items used by a user at a jobsite.

Figure 2:
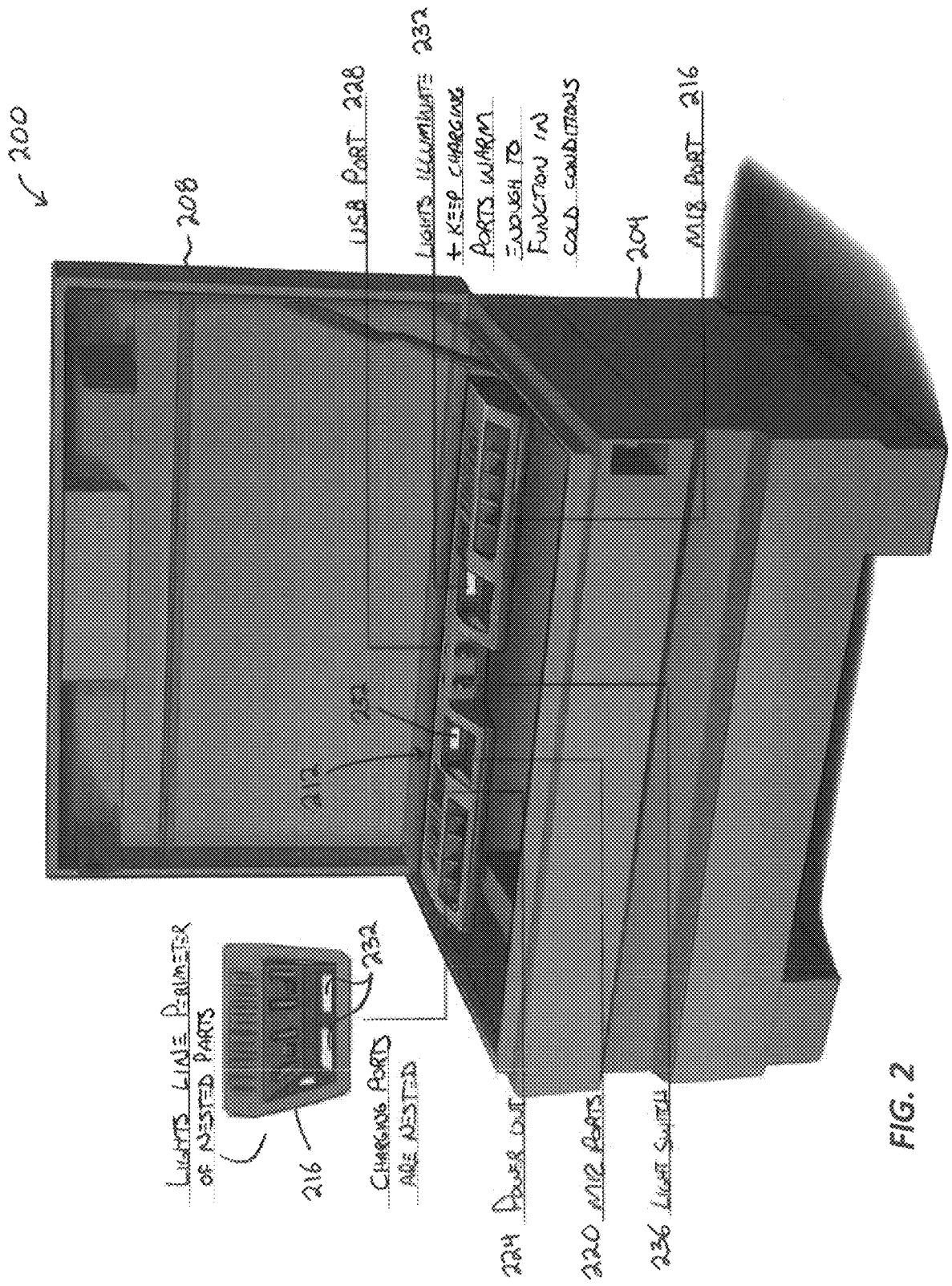
FIG. 2 is a perspective view of a job box including battery chargers and perimeter lights.

FIG. 2 illustrates another job box 200 including a base 204 and a lid 208. In the illustrated embodiment, the job box 200 also includes a battery charger fixture 212 coupled to the base 204 adjacent an upper edge of the base 204. The battery charger fixture 212 includes first charging ports 216 for charging a first type of battery pack (e.g., an 18V power tool battery pack), second charging ports 220 for charging a second type of battery pack (e.g., a 12V power tool battery pack), power outlets 224, and USB ports 228. The battery charger fixture 212 also includes lights 232 positioned in nested parts of the charging ports 216, 220. The lights 232 make it easy for the user to identify the separate charging ports 216, 220. In addition, the battery charger fixture 212 includes light switches 236 for selectively turning the lights 232 on and off. In some embodiments, the lights 232 can be designed and arranged to help warm the charging ports 216, 220 so the charging ports 216, 220 can function in cold conditions.

Figure 3:
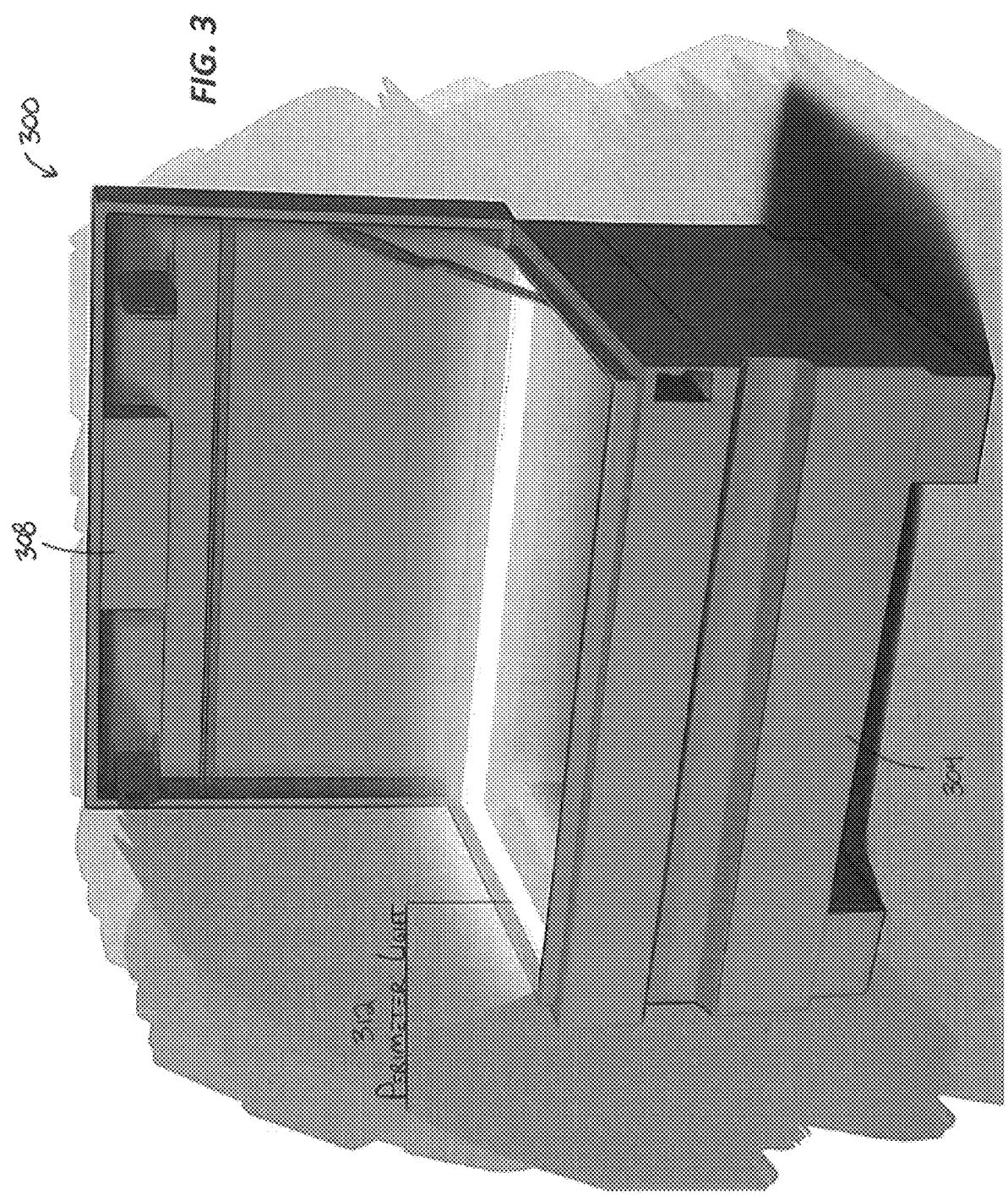
FIG. 3 is a perspective view of a job box including a perimeter light.

FIG. 3 illustrates another job box 300 including a base 304 and a lid 308. In the illustrated embodiment, the job box 300 also includes a perimeter light 312 coupled to the base 304 adjacent an upper edge of the base 304. The illustrated perimeter light 312 is a continuous light that extends around the entire upper edge of the base 304. In other embodiments, the perimeter light 312 may be divided into discrete lights, and/or the perimeter light 312 may only extend around part of the upper edge of the base 304.

Figure 4:
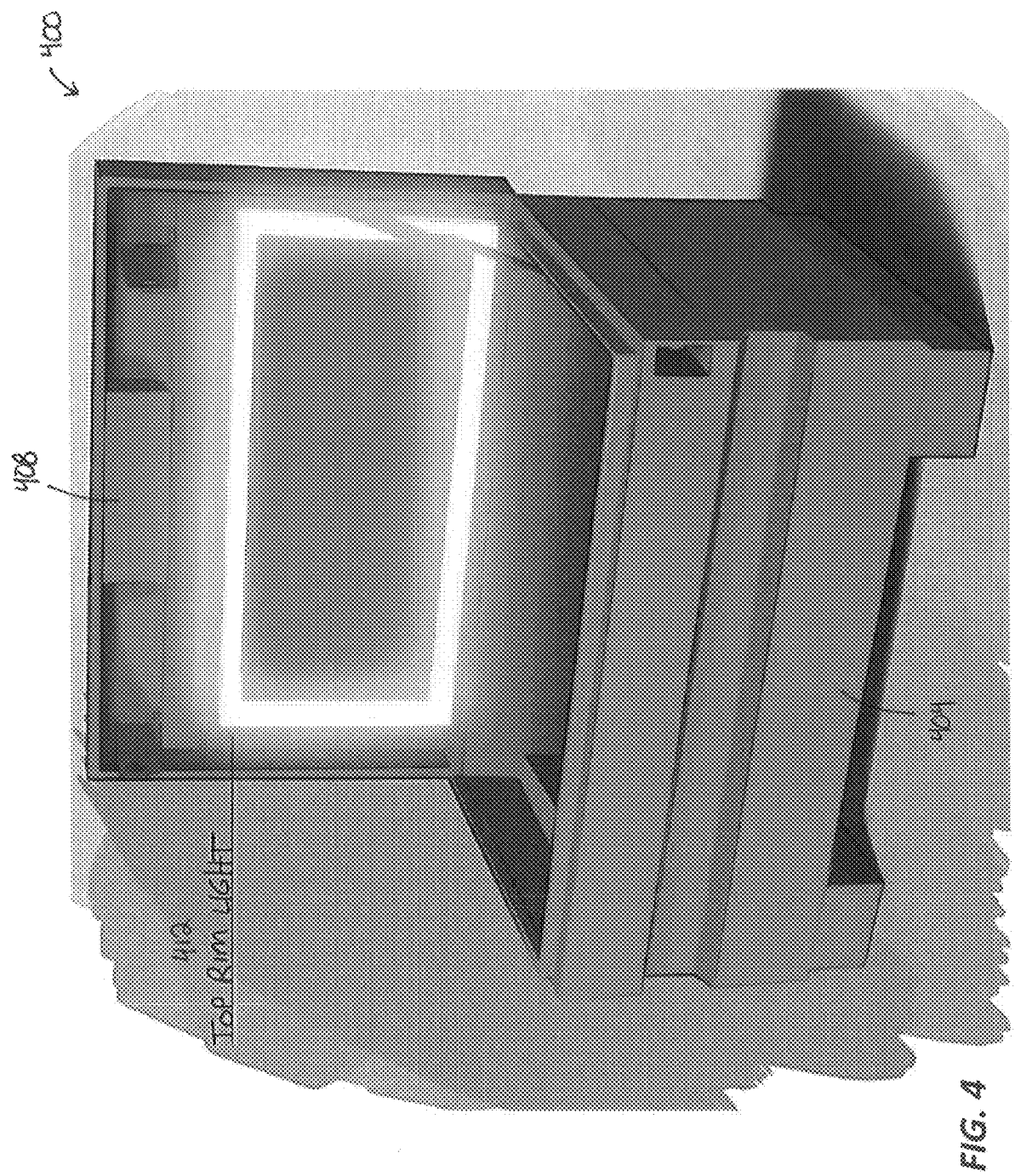
FIG. 4 is a perspective view of a job box including a top rim light.

FIG. 4 illustrates another job box 400 including a base 404 and a lid 408. In the illustrated embodiment, the job box 400 also includes a top rim light 412 coupled to an inner surface of the lid 408. The illustrated top rim light 412 forms a continuous rectangle on the lid 408. In other embodiments, the top rim light 412 may be divided into discrete lights, and/or may be arranged in other shapes on the lid 408.

Figure 5:
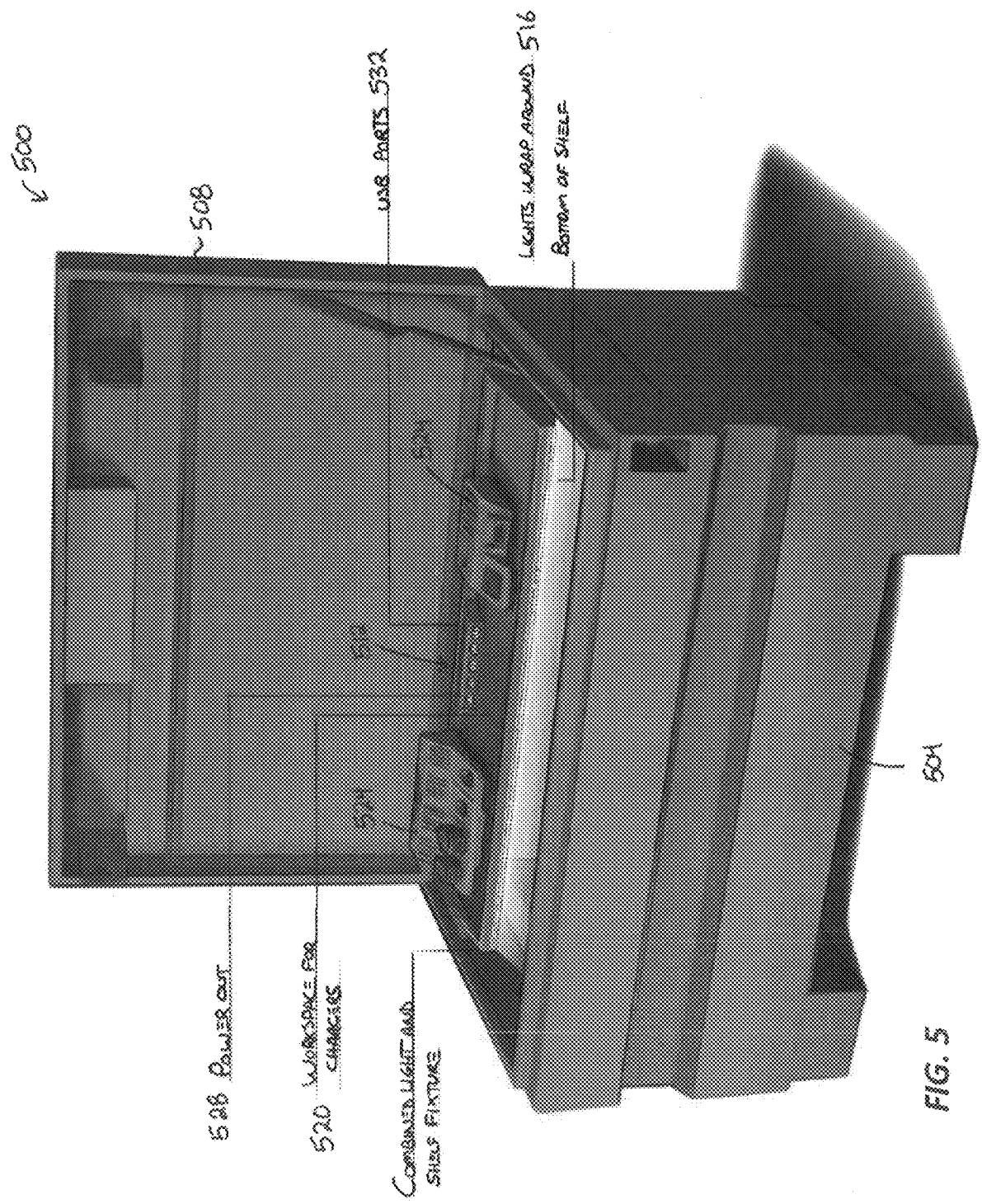
FIG. 5 is a perspective view of a job box including a combined light and shelf fixture.

FIG. 5 illustrates another job box 500 including a base 504 and a lid 508. In the illustrated embodiment, the job box 500 also includes a combined light and shelf fixture 512 coupled to the base 504 adjacent an upper edge of the base 504. The fixture 512 includes downwardly facing lights 516 and an upwardly facing shelf area 520. The lights 516 illuminate a storage area of the base 504. The shelf area 520 provides a workspace for, for example, battery chargers 524 or other tools. In some embodiments, such as the illustrated embodiment, the fixture 512 also includes power outlets 528 and USB ports 532.

Figure 6:
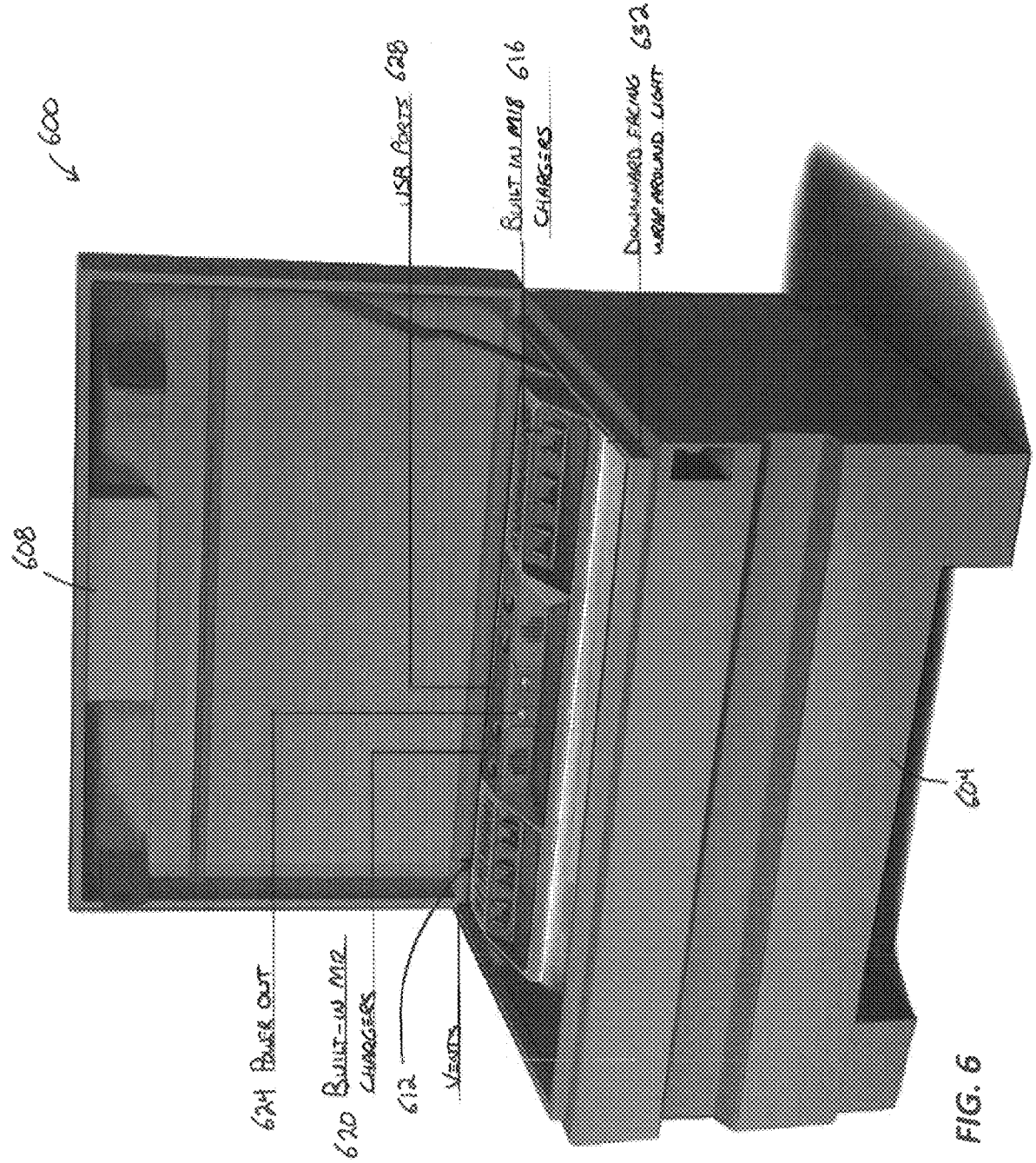
FIG. 6 is a perspective view of a job box including a combined charger and light fixture.

FIG. 6 illustrates another job box 600 including a base 604 and a lid 608. In the illustrated embodiment, the job box 600 also includes a combined charger and light fixture 612 coupled to the base 604 adjacent an upper edge of the base 604. The fixture 612 includes first charging ports 616 for charging a first type of battery pack (e.g., an 18V power tool battery pack), second charging ports 620 for charging a second type of battery pack (e.g., a 12V power tool battery pack), power outlets 624, and USB ports 628. The fixture 612 also includes a downwardly facing light 632 positioned beneath the charging ports 616, 620. The light 632 is positioned to direct light into a storage area of the base 604.

Figure 7:
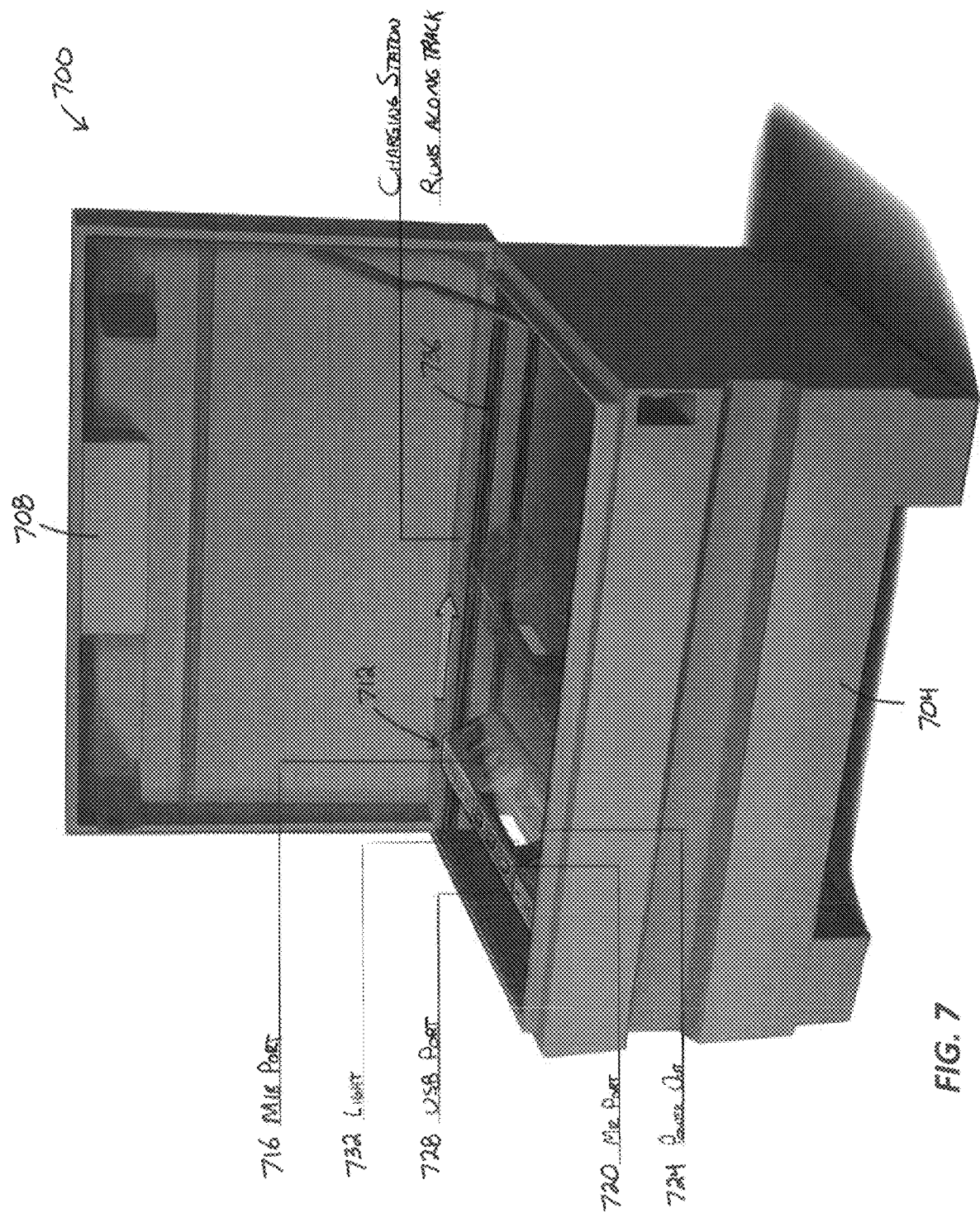
FIG. 7 is a perspective view of a job box including a charging station and light that is movable along a track.

FIG. 7 illustrates another job box 700 including a base 704 and a lid 708. In the illustrated embodiment, the job box 700 also includes a moveable charging station and light 712. The illustrated charging station and light 712 includes first charging ports 716 for charging a first type of battery pack (e.g., an 18V power tool battery pack), second charging ports 720 for charging a second type of battery pack (e.g., a 12V power tool battery pack), power outlets 724, USB ports 728, and a light 732. The charging station and light 712 is coupled to one or more tracks 736 formed adjacent an upper edge of the base 704 so that a user can selectively move the charging station and light 712 relative to the base 704. In the illustrated embodiment, the charging station and light 712 moves side-to-side relative to the base 704. In other embodiments, the charging station and light 712 may move front-to-back relative to the base 704.

Figure 8:
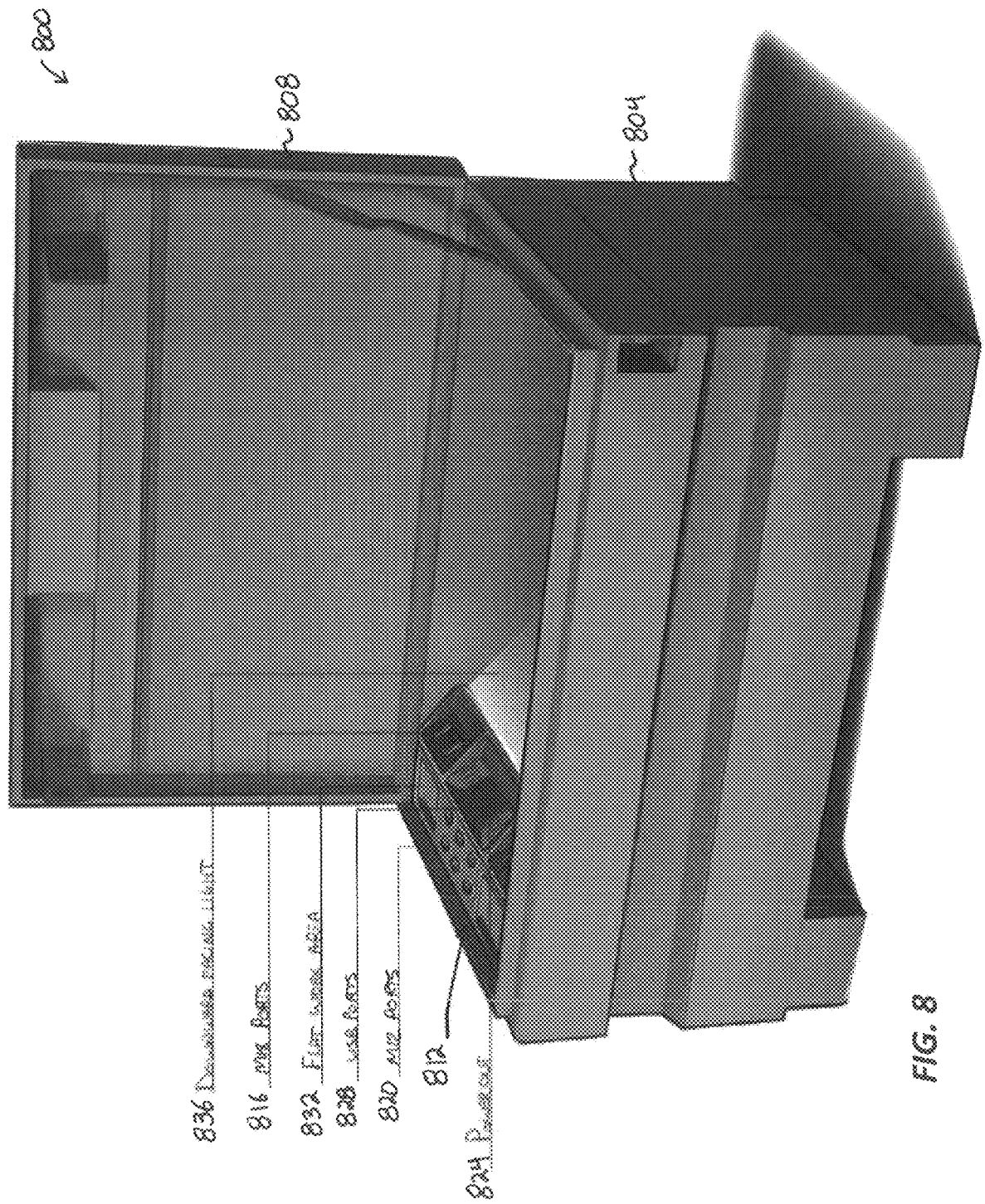
FIG. 8 is a perspective view of another job box including a combined charger and light fixture.

FIG. 8 illustrates another job box 800 including a base 804 and a lid 808. In the illustrated embodiment, the job box 800 also includes a combined charger and light fixture 812 coupled to the base 804 adjacent an upper edge of the base 804. The fixture 812 is positioned adjacent a side of the base 804 and includes first charging ports 816 for charging a first type of battery pack (e.g., an 18V power tool battery pack), second charging ports 820 for charging a second type of battery pack (e.g., a 12V power tool battery pack), power outlets 824, USB ports 828, and flat work areas 832. The fixture 812 also includes a downwardly facing light 836 positioned beneath the charging ports 816, 820. The light 836 is positioned to direct light into a storage area of the base 804.

Figure 9:
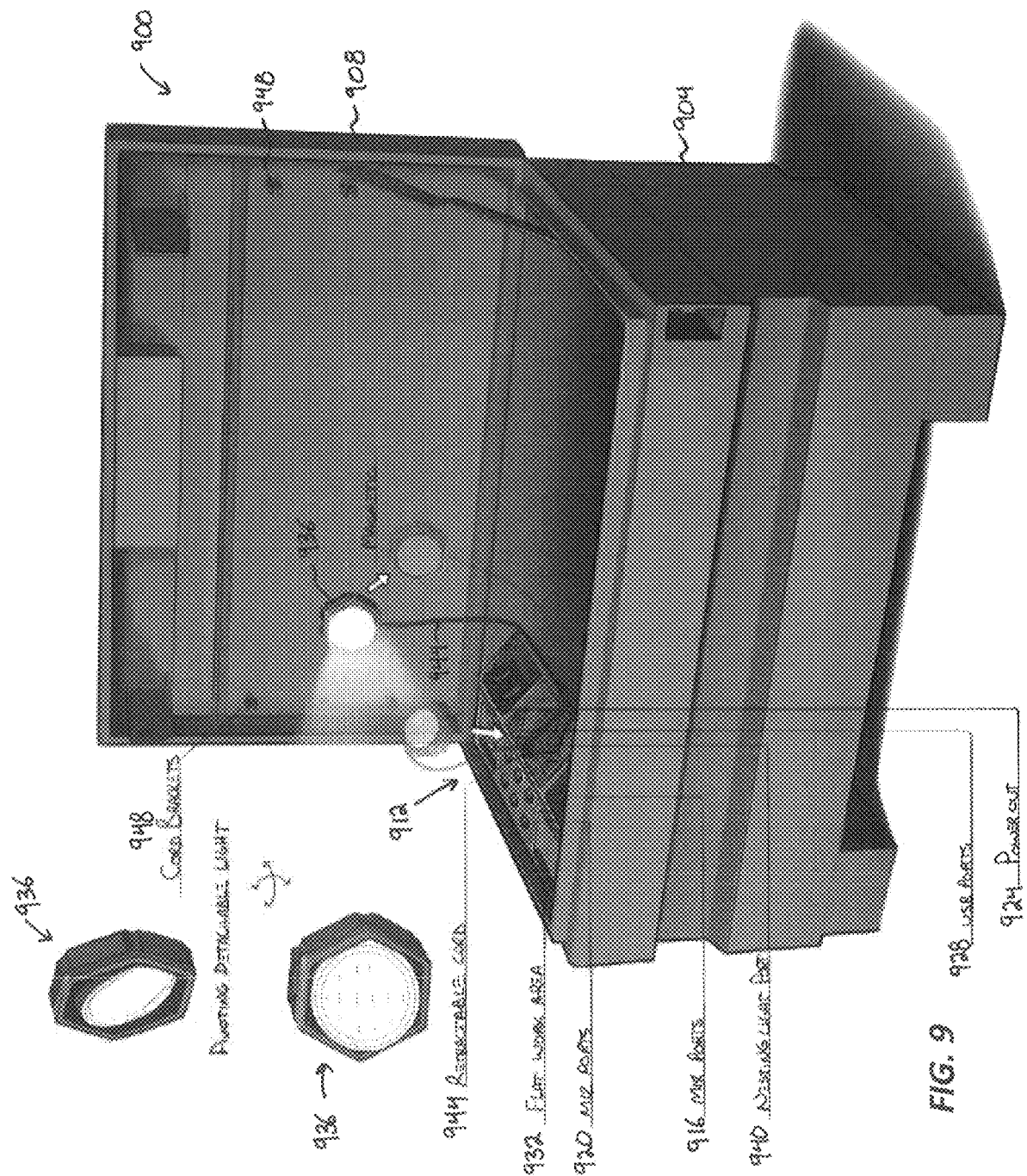
FIG. 9 is a perspective view of a job box including a combined charger and light fixture with detachable lights.

FIG. 9 illustrates another job box 900 including a base 904 and a lid 908. In the illustrated embodiment, the job box 900 also includes a combined charger and light fixture 912 coupled to the base 904 adjacent an upper edge of the base 904. The fixture 912 is positioned adjacent a side of the base 904 and includes first charging ports 916 for charging a first type of battery pack (e.g., an 18V power tool battery pack), second charging ports 920 for charging a second type of battery pack (e.g., a 12V power tool battery pack), power outlets 924, USB ports 928, and flat work areas 932, on which a user may place a tool or other item. The fixture 912 also includes detachable lights 936. The lights 936 can nest or be stored in one or more light ports 940 formed in the fixture 912. The lights 936 can also be extended out of the ports 940 and connected to the job box 900 at different locations (e.g., inner or outer surfaces of the lid 908, inner or outer surfaces of the base 904, etc.) by magnets, clips, hooks, Velcro, and the like. In some embodiments, such as the illustrated embodiment, the lights 936 remain attached to the fixture by cords 944 that provide power to the lights 936. In some embodiments, the cords 944 may be retractable, allowing the user to retract one of the lights 936 into one of the ports 940 without excess cord 944 protruding from the port 940. In the illustrated embodiment, cord brackets 948 are coupled to the inner surface of the lid 908 to provide cord management. In some embodiments, the brackets 948 may be coupled to the base 904. In some embodiments, the lights 936 may include pivotable lens and/or light units that allow a user to redirect the lights, as needed.

Figure 10:
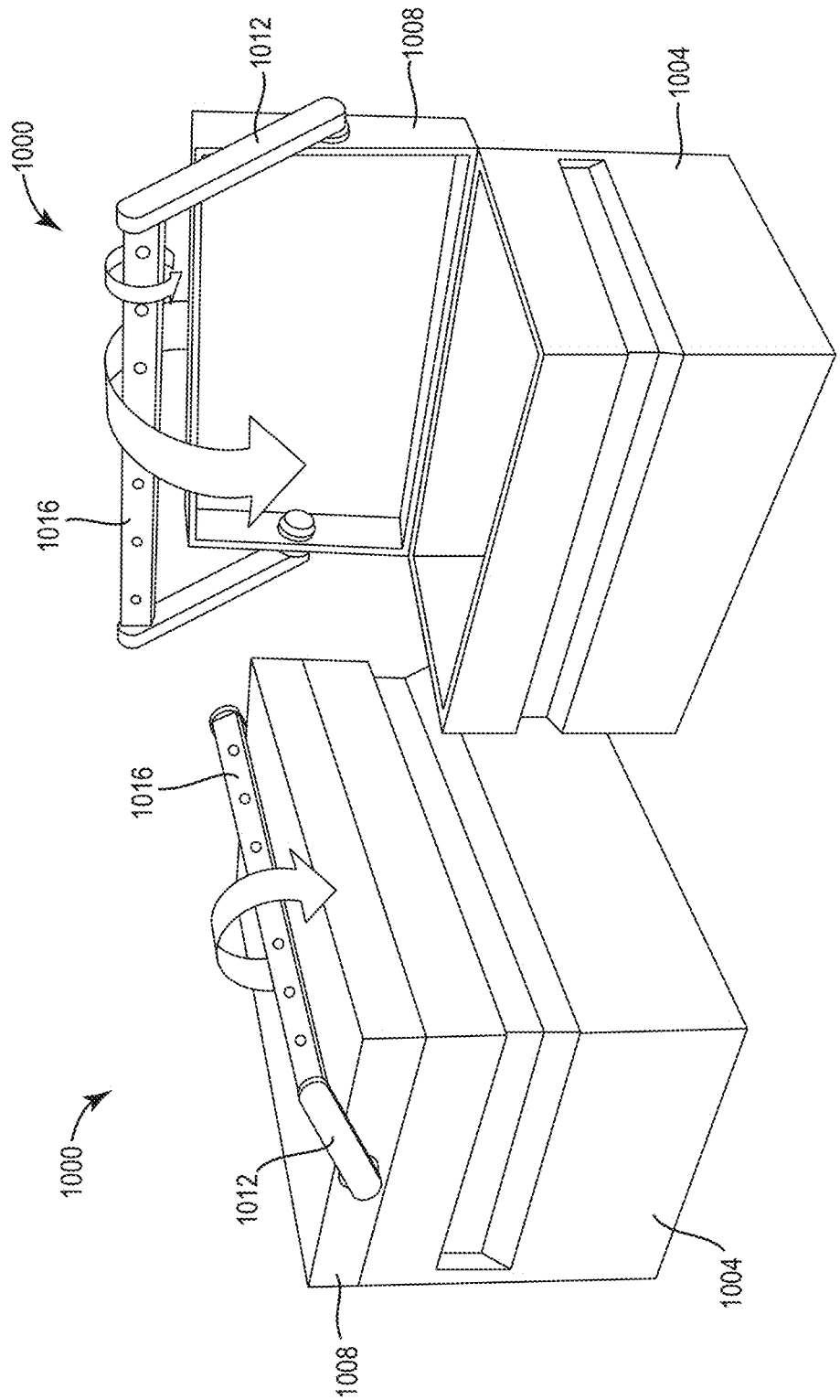
FIG. 10 illustrates a job box including a handle with a rotating light bar.

FIG. 10 illustrates another job box 1000 including a base 1004, a lid 1008, and a handle 1012 pivotally coupled to the lid 1008. In the illustrated embodiment, the job box 1000 also includes a light bar 1016 coupled to the handle 1012. The illustrated light bar 1016 is integrated into the handle 1012. More particularly, the light bar 1016 forms the part of the handle 1012 that is configured to be grasped by a user. In the illustrated embodiment, the handle 1012 is configured to be rotated relative to the base 1004 about a first axis, and the light bar 1016 is configured to be rotated relative to the rest of the handle 1012 about a second axis that is different than the first axis. The light bar 1016 stays outside of the job box 1000 when the lid 1008 is closed to provide light to the surrounding environment. The light bar 1016 can be pivoted inward when the lid 1008 is opened to provide light inside the job box 1000. In some embodiments, the light bar 1016 may be self-leveling.

Figure 11:
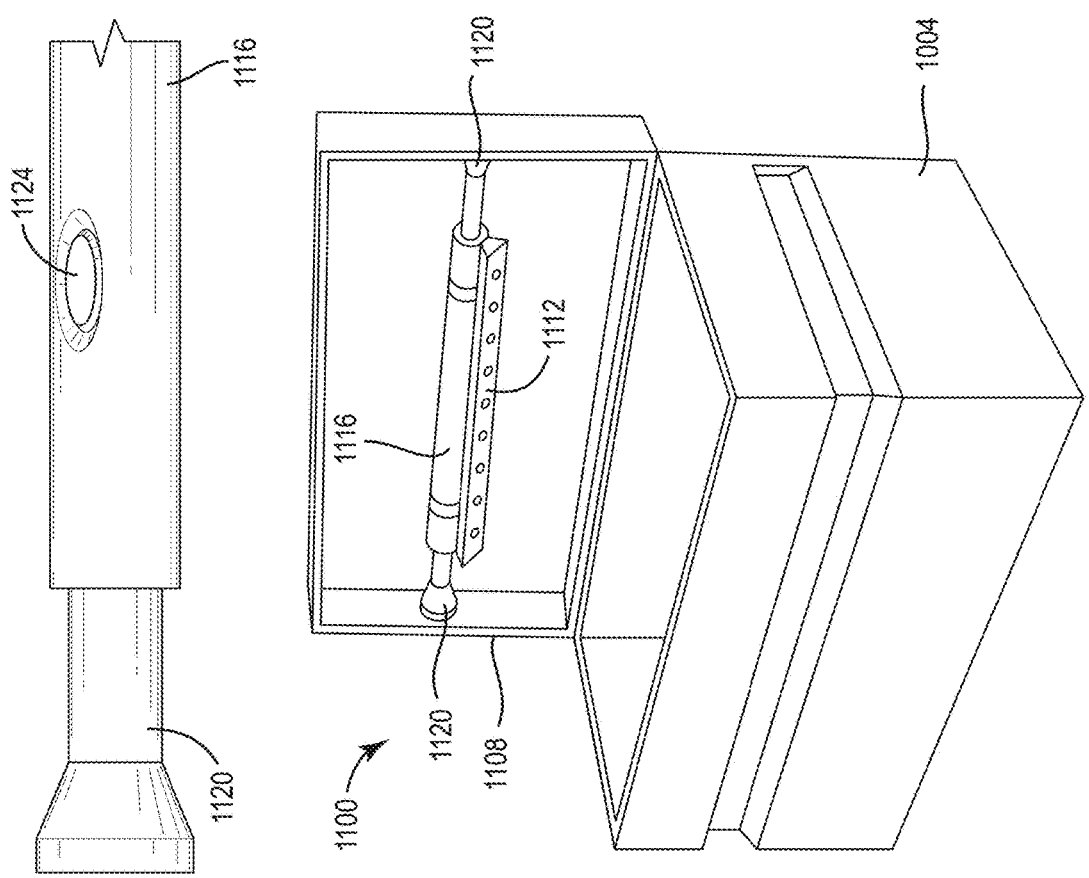
FIG. 11 illustrates a job box including an internal rotating light bar.

FIG. 11 illustrates another job box 1100 including a base 1104 and a lid 1108. In the illustrated embodiment, the job box 1100 also includes a light bar 1112 coupled to an inner surface of the lid 1108. The light bar 1112 is supported by a telescoping tube assembly 1116 that spans across the inner surface of the lid 1108. The telescoping tube assembly 1116 includes extension arms 1120 that can be selectively extended and retracted to fit within the lid 1108. In some embodiments, the extension arms 1120 may be spring-loaded and/or released by a manual actuator 1124 (e.g., a button, lever, dial, etc.). The illustrated light bar 1112 is rotatable relative to the telescoping tube assembly 1116. In some embodiments, the light bar 1116 may be self-leveling to direct light into the base 1104 regardless of the position of the lid 1108.

Figure 12:
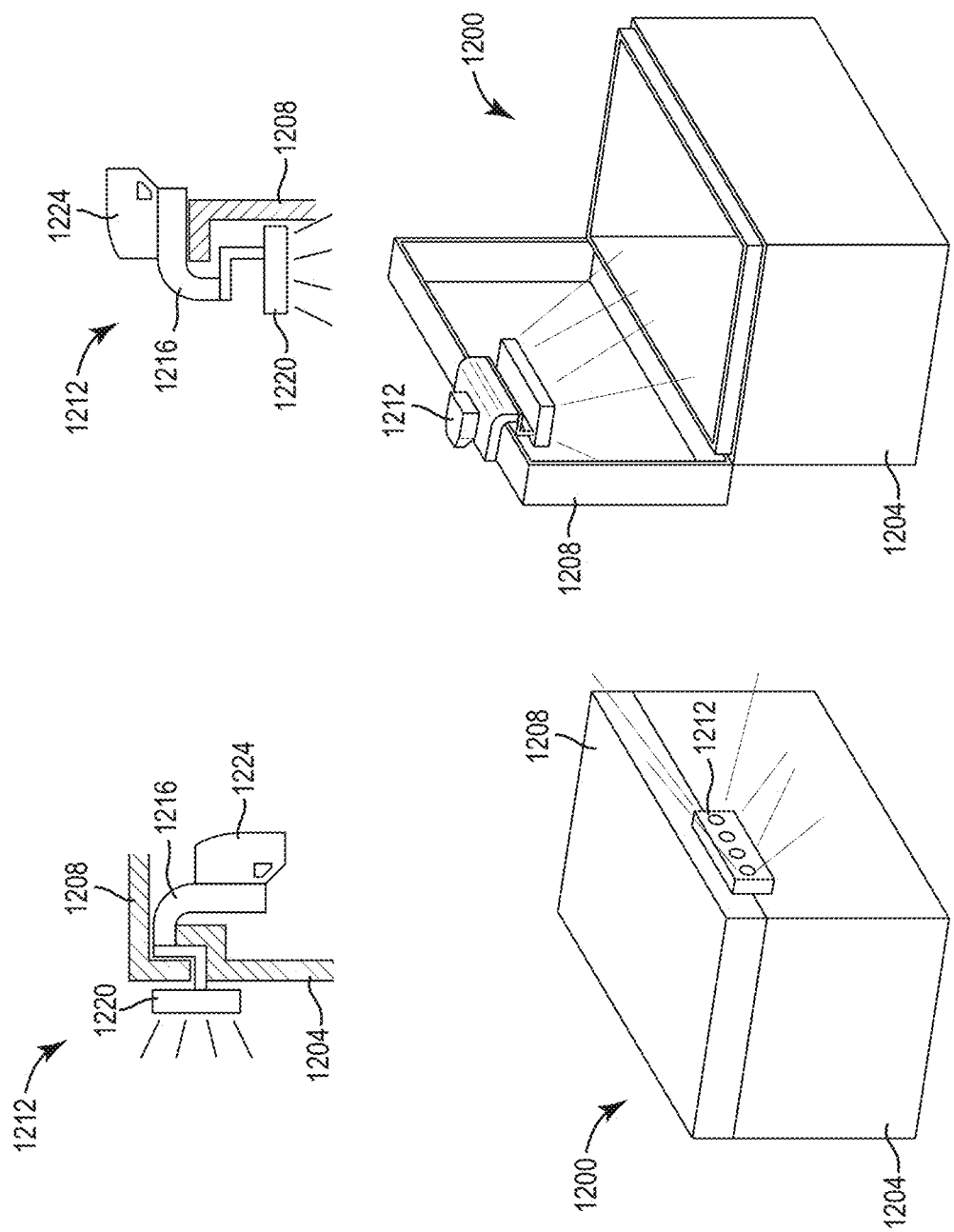
FIG. 12 illustrates a job box including a rotatable light coupled to a lid of the job box.

FIG. 12 illustrates another job box 1200 including a base 1204 and a lid 1208. In the illustrated embodiment, the job box 1200 also includes a rotatable light 1212. The rotatable light 1212 includes a mounting arm 1216, a light head 1220, and a battery 1224. The mounting arm 1216 fits within a gap between the base 1204 and the lid 1208 when the lid 1208 is closed, allowing the light 1212 to provide light external to the job box 1200. The mounting arm 1216 can also be coupled to an edge of the lid 1208 when the lid 1208 is opened, allowing the light 1212 to provide light inside the job box 1200. In some embodiments, the mounting arm 1216 may be coupled to the lid 1208 by a friction-fit or snap-fit connection. In other embodiments, the mounting arm 1216 may be coupled to the lid 1208 by magnets, Velcro, adhesives, or other suitable fasteners. The light head 1220 is movable (e.g., pivotable and/or rotatable) relative to the mounting arm 1216 so a user can redirect the light head 1220, as needed. In some embodiments, the light head 1220 may be self-leveling.

Figure 13:
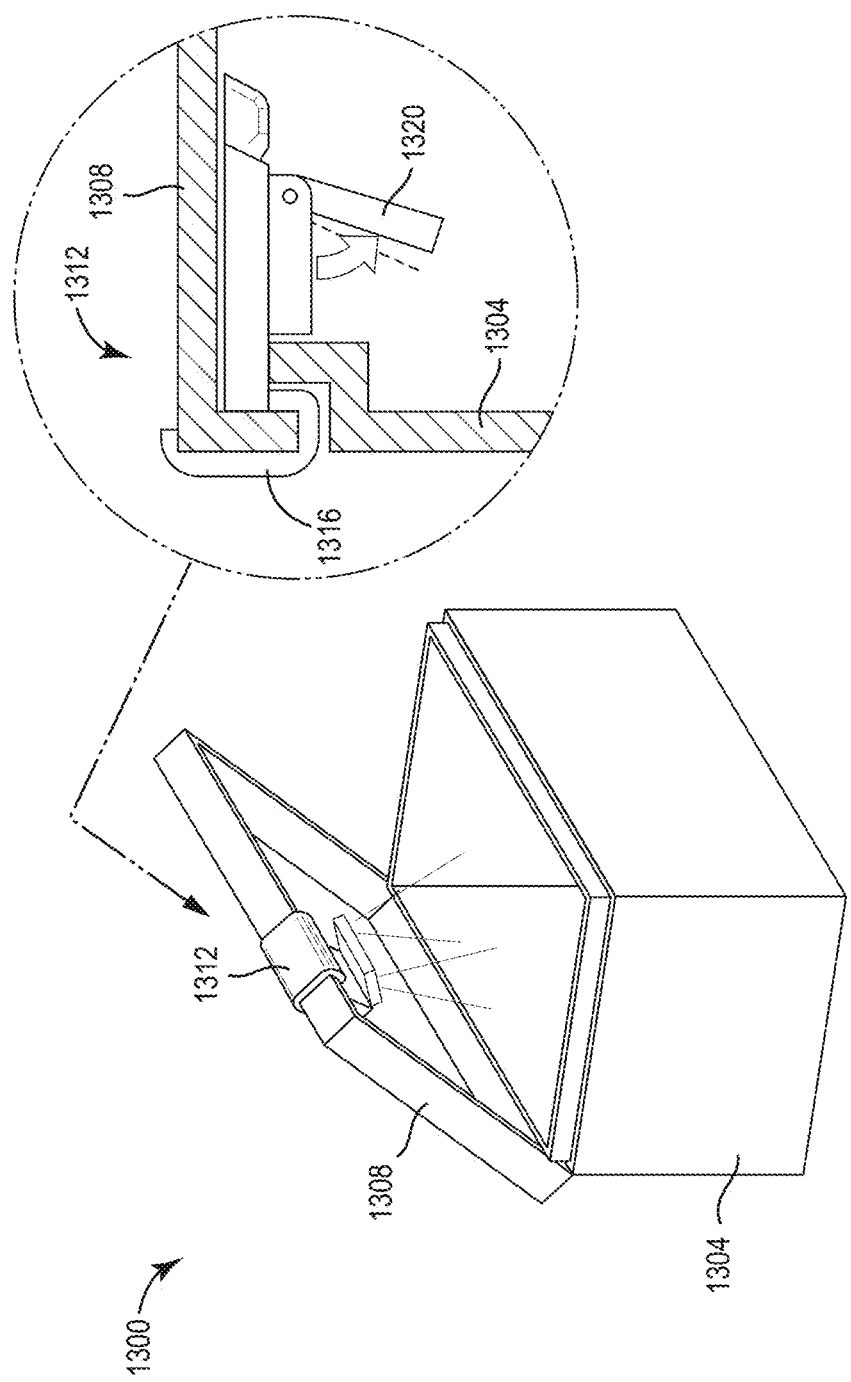
FIG. 13 illustrates a job box including another rotatable light coupled to a lid of the job box.

FIG. 13 illustrates another job box 1300 including a base 1304 and a lid 1308. In the illustrated embodiment, the job box 1300 also includes a rotatable light 1312. The rotatable light 1312 includes a mounting arm 1316 and a light head 1320. In some embodiments, the rotatable light 1312 may also include a battery. The mounting arm 1316 is coupled to an edge of the lid 1308. In the illustrated embodiment, the mounting arm 1316 clips over the edge of lid 1308. In other embodiments, the mounting arm 1316 may be coupled to the lid 1308 by magnets, Velcro, adhesives, or other suitable fasteners. The light head 1320 is movably coupled to the mounting arm 1316 and positioned generally within the periphery of the lid 1308 so that the light head 1320 is contained within the job box 1300 when the lid 1308 is closed. The light head 1320 is movable (e.g., pivotable and/or rotatable) relative to the mounting arm 1316 so a user can redirect the light head 1320, as needed, such as when the lid 1308 is opened and the user wants to light to shine inside the base 1304 or outside the job box 1300. In some embodiments, the light head 1320 may be self-leveling.

Figure 14:
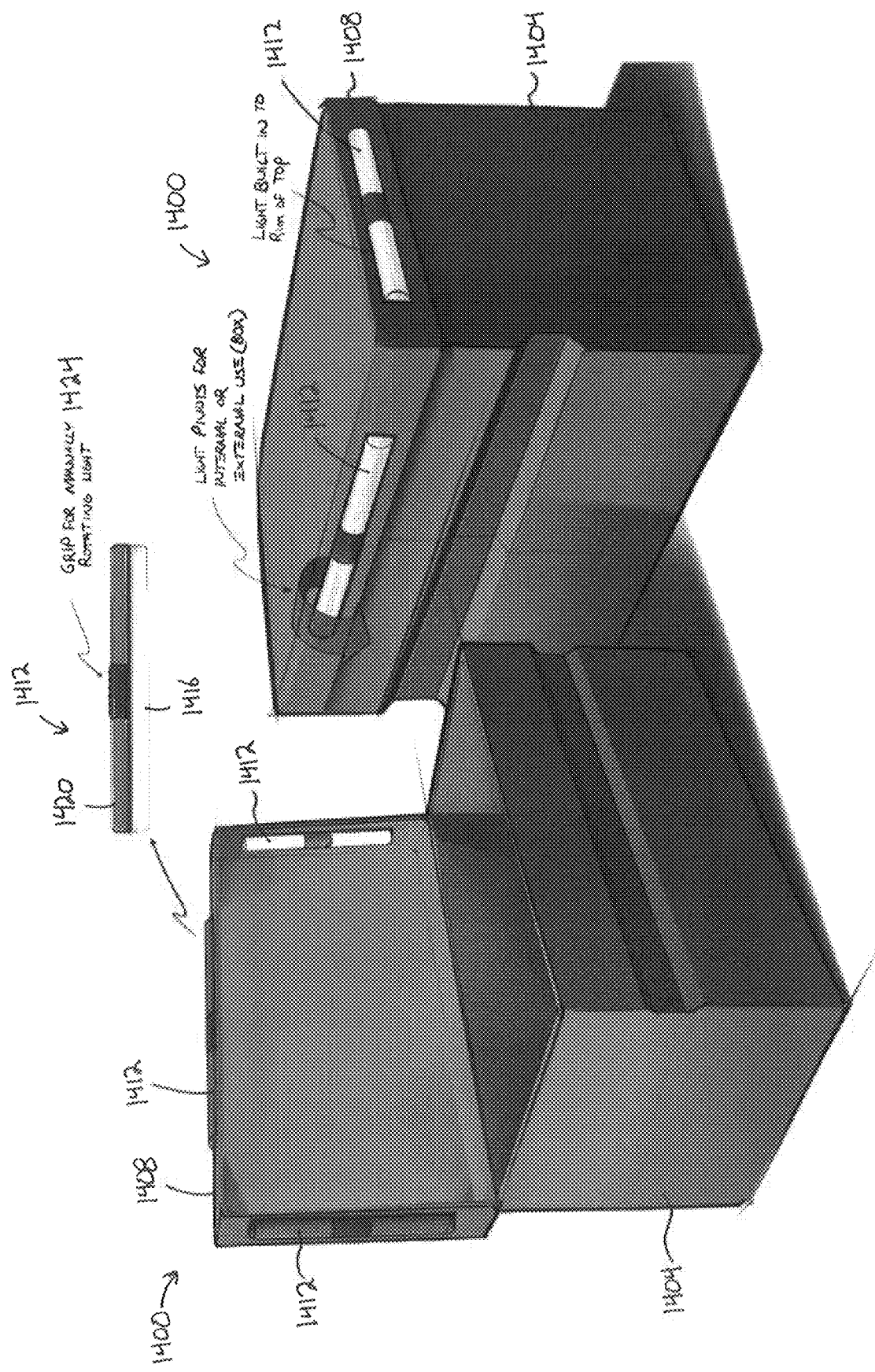
FIG. 14 illustrates a job box including rotatable lights.

FIG. 14 illustrates another job box 1400 including a base 1404 and a lid 1408. In the illustrated embodiment, the job box 1400 also includes rotatable lights 1412 coupled to a rim of the lid 1308. The illustrated job box 1400 includes three rotatable lights 1412: one coupled to a front wall of the rim, one coupled to a left side wall of the rim, and one coupled to a right side wall of the rim. In other embodiments, the rotatable lights 1412 may be positioned elsewhere on the job box 1400, and/or the job box 1400 may include fewer or more lights 1412. Each of the illustrated lights 1412 includes a lens side 1416 and a cover side 1420. Light is transmitted through the lens side 1416. The lights 1412 are rotatable relative to the lid 1408 so that the lens sides 1416 face inward when the lid 1408 is open to direct light into the job box 1400, and the lens sides 1416 face outward when the lid 1408 is closed to direct light outward from the job box 1400. Each light 1412 also includes a grip 1424 to facilitate manually rotating the lights 1412 between positions. In some embodiments, the rotatable lights 1412 may be self-leveling to move between facing inward or outward depending on whether the lid 1408 is closed or opened.

Figure 15:
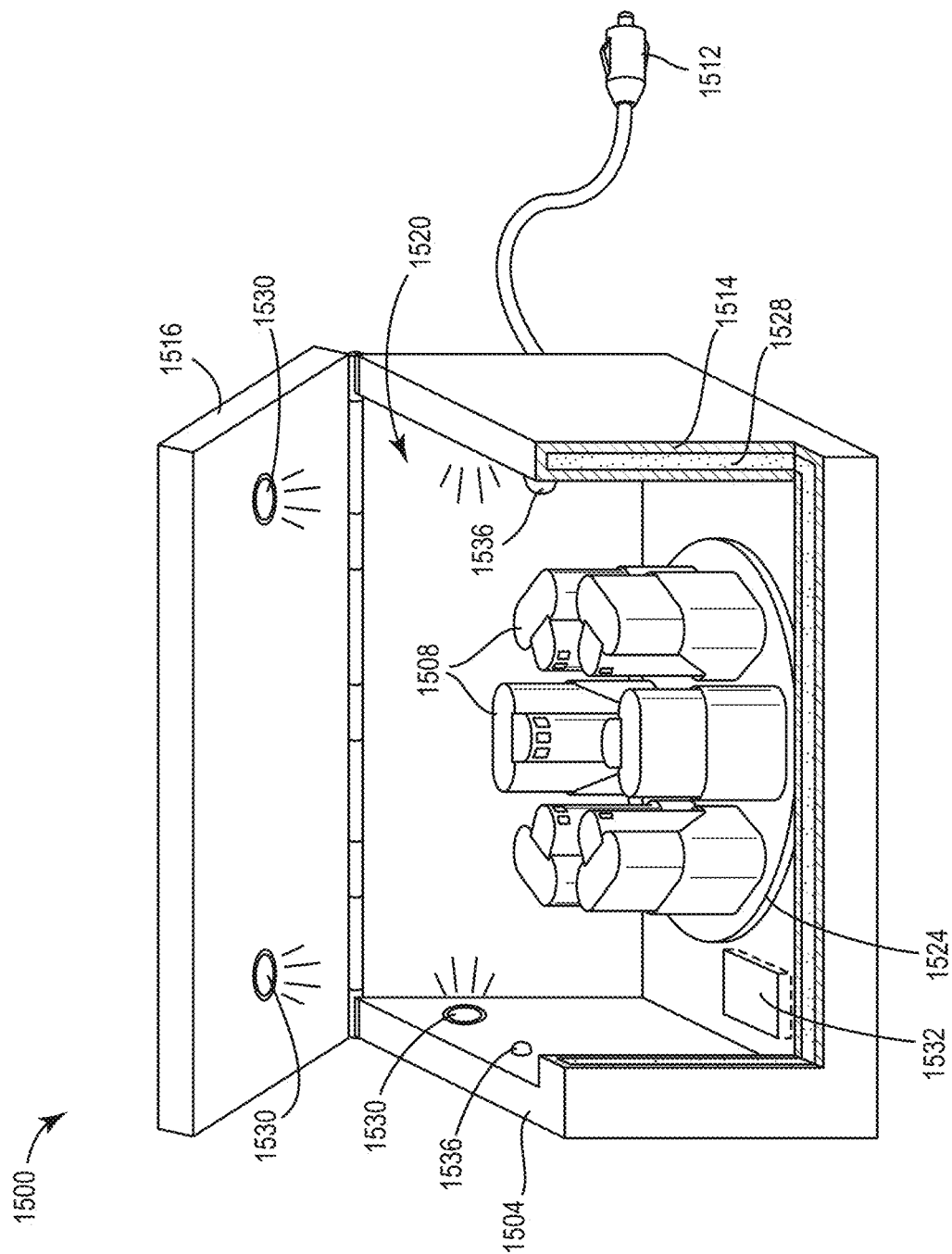
FIG. 15 illustrates one embodiment of a powered warming charger that is selectively removable from a job box.

As shown in FIG. 15, one or more of the job boxes discussed above may include a heating element 1500 to help warm battery packs before or during charging. For example, the heating element 1500 may heat the battery packs to at least 35° F. so the battery packs are not cold. The heating element 1500 is selectively removable from the job boxes described above, or may be integrally formed into the job boxes described above.

With continued reference to FIG. 15, the heating element 1500 is a heating container 1504 that receives one or more battery packs 1508 and is powered by a 12V cigarette lighter outlet 1512. In some embodiments, the container 1504 has an internal storage geometry similar to a six-pack cooler, in which the container 1504 can receive up to six battery packs 1508. The container 1504 includes a base 1514 and may include a cover 1516 pivotally coupled to the base 1514. The cover 1516 can selectively open and close the container 1504 for removal and insertion of the battery packs 1508. In some embodiments, the cover 1516 is a cigar-type clamshell cover. In other embodiments, the cover 1516 is a barn house-type lid. The base 1514 defines a heating area 1520 which is heated by a heating member 1524 to heat the battery packs 1508. In some embodiments, the heating member 1524 is a hot plate-type device on a floor of the container 1504 on which the battery packs 1508 can be placed. In other embodiments, the heating member 1524 is a warming charger that can receive, warm, and recharge battery packs 1508 in the container 1504. In some embodiments, the container 1504 includes insulation 1528 to prevent heat energy from escaping the container 1504. In some embodiments, the container 1504 includes one or more lights 1530 on the cover 1516 or base 1514.

In some embodiments, the container 1504 may be powered by a separate battery 1532. In some embodiments, the heating element 1500 may be configured as a cooler adapter to sustain temperatures. In other embodiments, the heating element 1500 may be configured as a thermal container to passively keep the battery packs 1508 warm. In some embodiments, the heating element 1500 includes temperature sensors 1536 and may use a controller (not shown) to variably adjust the heat within the container 1504. In some embodiments, the heating element 1500 uses propane instead of electrical resistance to provide heat. In some embodiments, the heating element 1500 may act through thermodynamic transfer.

The heating element 1500 may be used in conjunction with a job box, such as one of the job boxes described above. The heating element 1500 may be a separate element that plugs into the job box. Alternatively, the heating element 1500 may be integrated into the job box.

Figure 16:
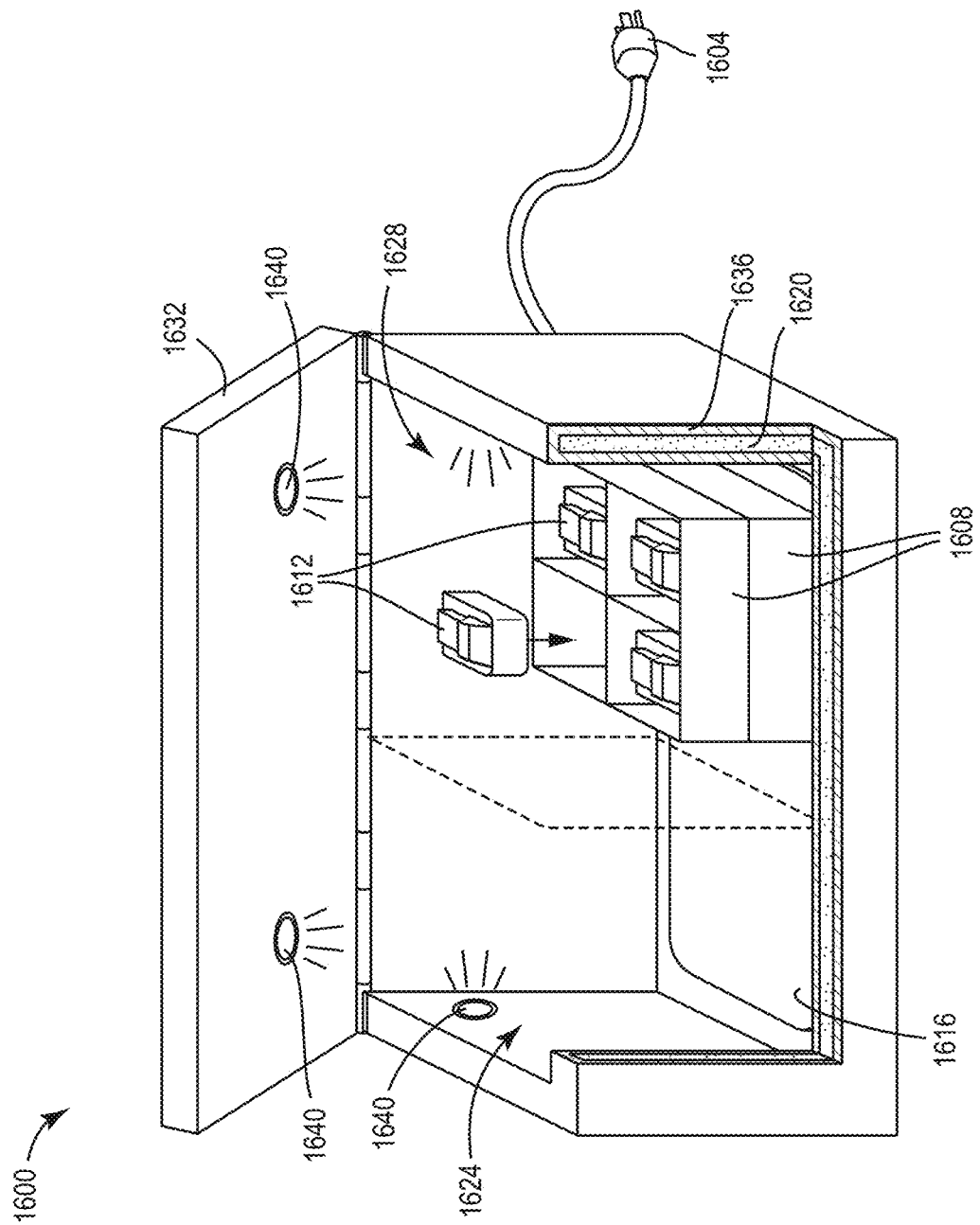
FIG. 16 illustrates another embodiment of a job box including a warming charger.

In other embodiments, as shown in FIG. 16, a job box 1600 itself may be heated and include an extension cord 1604 that plugs into an outlet to heat the box 1600 at the end of the day, or when the job box 1600 is not being used for an extended period of time. In some embodiments, the job box 1600 may include one or more racks 1608 to organize battery packs 1612 within the box 1600. The job box 1600 includes a heating member 1616 and insulation 1620 to prevent heat energy from escaping the box 1600.

In some embodiments, the job box 1600 includes a relatively higher heat zone 1624 and a relatively lower heat zone 1628 to provide different warming levels in different areas. For example, the warmer zone 1624 may be used for a user's boots, while a cooler zone 1628 may be used for battery packs 1612. In some embodiments, a lid 1632 pivotally coupled to a base 1636 of the job box 1600 may seal like a refrigerator door to maintain the temperature within the job box 1600. In some embodiments, the job box 1600 may be solar powered instead of using the extension cord 1604. In some embodiments, one or more lights 1640 may be included on the lid 1632 or base 1636. In some embodiments, at least one light 1640 is positioned within the higher heat zone 1624 and at least one light 1640 is positioned within the lower heat zone 1628.

Although the lights and heating elements were described above with reference to separate embodiments, it should be readily apparent that features of the lights and heating elements may be used interchangeably. For example, features described above with reference to one light are equally applicable to another light described in the above disclosure.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A job box comprising:
a base including a front wall, a rear wall opposite the front wall, a first side wall extending between the front wall and the rear wall, and a second side wall extending between the front wall and the rear wall opposite the first side wall, the front wall, the rear wall, the first side wall, and the second side wall defining a storage area;
a lid pivotally coupled to the rear wall of the base and moveable between an open position, in which the storage area is accessible, and a closed position, in which the storage area in not accessible; and
a charging station supported by the base, the station including
a first charging port configured to charge a battery pack of a first type,
a second charging port configured to charge a battery pack of a second type,
a light, and
a first power outlet,
wherein the charging station is moveable relative to the job box to a plurality of different positions,
wherein the charging station includes a front face supporting the light and a rear face opposite the front face, and
wherein the charging station is moveable to a first position within the storage area in which the rear face is adjacent the first side wall of the base and the light projects light towards the second side wall.

2. The job box of claim 1, wherein at least some of the plurality of different positions are located within the storage area, and wherein the charging station is moveable as a unit to the at least some of the plurality of different positions to be supported within the storage area.

3. The job box of claim 2, further comprising tracks configured to support the charging station.

4. The job box of claim 3, wherein the tracks are positioned within the storage area, and wherein the charging station is moveable on the tracks to the at least some of the plurality of different positions.

5. The job box of claim 1, wherein the first power outlet is first type of outlet, and wherein the charging station further includes a second power outlet.

6. The job box of claim 5, wherein the second power outlet is a second type of outlet different than the first type of outlet.

7. The job box of claim 6, wherein the first type of outlet is a USB port.

8. The job box of claim 1, wherein the second charging port is one of a plurality of second charging ports.

9. The job box of claim 1, wherein the first charging port is configured to charge a 12 volt power tool battery pack, and wherein the second charging port is configured to charge an 18 volt power tool battery pack.

10. A charging station for use with a job box, the charging station comprising:
an elongated body;
a first charging port supported by the elongated body and configured to charge a 12 volt power tool battery pack;
a second charging port supported by the elongated body and configured to charge an 18 volt power tool battery pack;
a light supported by the elongated body adjacent one or more of the first charging port and the second charging port, the light configured to project light away from the elongated body and to warm one or more of the first charging port and the second charging port; and
a power outlet supported by the elongated body;
wherein the elongated body is positionable in a plurality of different orientations on the job box.

11. The charging station of claim 10, wherein the first charging port and the second charging port are positioned on different sides of the elongated body.

12. The charging station of claim 10, wherein the first charging port is positioned next to a first side of the light and the second charging port is positioned next to a second side of the light.

13. The charging station of claim 10, wherein the light is positioned in a central region of the elongated body.

14. The charging station of claim 10, further comprising a USB port supported by the elongated body.

15. A job box comprising:
a base defining a storage area;
a lid coupled to the base and moveable between an open position, in which the storage area is accessible, and a closed position, in which the storage area in not accessible;
a first charging port configured to charge a battery pack of a first type;
a second charging port configured to charge a battery pack of a second type;
a light positioned between the first charging port and the second charging port, the first charging port, the second charging port, and the light all being exposed to the storage area;
a first power outlet of a first type; and
a second power outlet of a second type,
wherein the first charging port, the second charging port, the light, the first power outlet, and the second power outlet are moveable relative the base and the lid as a single unit to different positions on the job box, and
wherein the light projects light away from the first charging port and the second charging port.

16. The job box of claim 15, wherein the first power outlet includes a USB port.

17. The job box of claim 15, wherein the second charging port is one of a plurality of second charging ports.

18. The job box of claim 15, wherein the first charging port is configured to charge a 12 volt power tool battery pack, and wherein the second charging port is configured to charge an 18 volt power tool battery pack.

19. The job box of claim 15, wherein the first charging port, the second charging port, the light, the first power outlet, and the second power outlet are coupled to a body including a front face and a rear face, wherein at least the light is supported on the front face of the body, and wherein the body is moveable to a position within the storage area in which the rear face is adjacent a wall of the base.

* * * * *